US009426113B2

(12) United States Patent
Mahadevan et al.

(10) Patent No.: US 9,426,113 B2
(45) Date of Patent: Aug. 23, 2016

(54) SYSTEM AND METHOD FOR MANAGING DEVICES OVER A CONTENT CENTRIC NETWORK

(71) Applicant: Palo Alto Research Center Incorporated, Palo Alto, CA (US)

(72) Inventors: Priya Mahadevan, Sunnyvale, CA (US); Glenn C. Scott, Los Altos, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 157 days.

(21) Appl. No.: 14/320,235

(22) Filed: Jun. 30, 2014

(65) Prior Publication Data

US 2015/0381546 A1 Dec. 31, 2015

(51) Int. Cl.

*G06F 15/173* (2006.01)
*H04L 12/58* (2006.01)
*H04L 12/24* (2006.01)
(Continued)

(52) U.S. Cl.

CPC ............ *H04L 51/24* (2013.01); *H04L 41/0803* (2013.01); *H04L 43/08* (2013.01); *H04L 47/70* (2013.01); *H04L 67/025* (2013.01); *H04L 67/32* (2013.01); *H04L 67/327* (2013.01); *H04L 45/748* (2013.01)

(58) Field of Classification Search

CPC ... H04L 41/12; H04L 67/1078; H04L 67/237; H04L 67/035
USPC .......................................................... 709/223
See application file for complete search history.

(56) References Cited

U.S. PATENT DOCUMENTS 817,441 A 4/1906 Niesz
4,309,569 A 1/1982 Merkle
(Continued)

FOREIGN PATENT DOCUMENTS

DE 1720277 A1 6/1967
DE 19620817 A1 11/1997
(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Phuoc Nguyen
(74) *Attorney, Agent, or Firm* — Shun Yao; Park, Vaughan, Fleming & Dowler LLP

(57) ABSTRACT

A device can process commands from a remote device that manages the local device over a content centric network. During operation, the device can receive an Interest for managing a device resource, such that the Interest's name includes a name or a name prefix associated with the device resource, and includes a command for managing the resource. If the device determines that the name prefix corresponds to the local device, the device analyzes the Interest's command to determine a device resource and performs the resource-managing operation on the device resource. If the name prefix does not correspond to the local device, the device performs a longest-prefix-matching lookup using the Interest's name prefix to determine a destination for the Interest. If the Interest's destination corresponds to a component of the local device, the device forwards the Interest to the component or a local agent for the component.

18 Claims, 8 Drawing Sheets

400
START
RECEIVE AN INTEREST FOR MANAGING A NETWORK DEVICE 402
DOES THE INTEREST'S NAME PREFIX MATCH A ROUTABLE PREFIX TO THE LOCAL DEVICE? 404
NO
YES
DETERMINE A NETWORK DEVICE OR COMPONENT ASSOCIATED WITH THE INTEREST'S NAME PREFIX 406
FORWARD THE INTEREST TO AN AGENT FOR THE NETWORK DEVICE OR RESOURCE 408
DETERMINE ONE OR MORE TARGET RESOURCES BEING MANAGED BY THE INTEREST 410
DETERMINE AN OPERATION TO PERFORM ON THE RESOURCE(S) 412
PERFORM THE OPERATION ON THE RESOURCE(S) 414
RETURNING A CONTENT OBJECT THAT INCLUDES RESULTS FROM PERFORMING THE OPERATION ON THE RESOURCE(S) 416
END

(51) Int. Cl.

| | |
|---|---|
| ***H04L 12/26*** | (2006.01) |
| ***H04L 12/911*** | (2013.01) |
| ***H04L 29/08*** | (2006.01) |
| *H04L 12/745* | (2013.01) |

(56) References Cited

U.S. PATENT DOCUMENTS 4,921,898 A 5/1990 Lenney
5,070,134 A 12/1991 Oyamada
5,110,856 A 5/1992 Oyamada
5,506,844 A 4/1996 Rao
5,629,370 A 5/1997 Freidzon
5,870,605 A 2/1999 Bracho
6,052,683 A 4/2000 Irwin
6,091,724 A 7/2000 Chandra
6,173,364 B1 1/2001 Zenchelsky
6,226,618 B1 5/2001 Downs
6,233,646 B1 5/2001 Hahm
6,332,158 B1 12/2001 Risley
6,366,988 B1 4/2002 Skiba
6,574,377 B1 6/2003 Cahill
6,654,792 B1 11/2003 Verma
6,667,957 B1 12/2003 Corson
6,681,220 B1 1/2004 Kaplan
6,681,326 B2 1/2004 Son
6,769,066 B1 7/2004 Botros
6,772,333 B1 8/2004 Brendel
6,862,280 B1 3/2005 Bertagna
6,901,452 B1 5/2005 Bertagna
6,917,985 B2 7/2005 Madruga
6,968,393 B1 11/2005 Chen
6,981,029 B1 12/2005 Menditto
7,013,389 B1 3/2006 Srivastava
7,031,308 B2 4/2006 Garcia-Luna-Aceves
7,061,877 B1 6/2006 Gummalla
7,206,860 B2 4/2007 Murakami
7,210,326 B2 * 5/2007 Kawamoto ........... B21D 43/055 198/621.1
7,246,159 B2 * 7/2007 Aggarwal ........... G06F 11/3495 709/220
7,257,837 B2 8/2007 Xu
7,287,275 B2 10/2007 Moskowitz
7,315,541 B1 1/2008 Housel
7,339,929 B2 3/2008 Zelig
7,350,229 B1 3/2008 Lander
7,382,787 B1 6/2008 Barnes
7,444,251 B2 10/2008 Nikovski
7,466,703 B1 12/2008 Arunachalam
7,472,422 B1 12/2008 Agbabian
7,496,668 B2 2/2009 Hawkinson
7,509,425 B1 3/2009 Rosenberg
7,523,016 B1 4/2009 Surdulescu
7,543,064 B2 6/2009 Juncker
7,552,233 B2 6/2009 Raju
7,555,482 B2 6/2009 Korkus
7,555,563 B2 6/2009 Ott
7,567,547 B2 7/2009 Mosko
7,567,946 B2 7/2009 Andreoli
7,580,971 B1 8/2009 Gollapudi
7,623,535 B2 11/2009 Guichard
7,647,507 B1 1/2010 Feng
7,660,324 B2 2/2010 Oguchi
7,685,290 B2 3/2010 Satapati
7,698,463 B2 4/2010 Ogier
7,769,887 B1 8/2010 Bhattacharyya
7,779,467 B2 8/2010 Choi
7,801,177 B2 9/2010 Luss
7,816,441 B2 10/2010 Elizalde
7,831,733 B2 11/2010 Sultan
7,908,337 B2 3/2011 Garcia-Luna-Aceves
7,924,837 B1 4/2011 Shabtay
7,953,885 B1 5/2011 Devireddy
8,000,267 B2 8/2011 Solis
8,010,691 B2 8/2011 Kollmansberger
8,074,289 B1 12/2011 Carpentier
8,117,441 B2 2/2012 Kurien
8,160,069 B2 4/2012 Jacobson
8,204,060 B2 6/2012 Jacobson
8,214,364 B2 7/2012 Bigus
8,224,985 B2 7/2012 Takeda
8,225,057 B1 7/2012 Zheng
8,271,578 B2 9/2012 Sheffi
8,312,064 B1 11/2012 Gauvin
8,386,622 B2 2/2013 Jacobson
8,447,851 B1 * 5/2013 Anderson ........... G06F 11/3006 707/600
8,467,297 B2 6/2013 Liu
8,553,562 B2 10/2013 Allan
8,572,214 B2 10/2013 Garcia-Luna-Aceves
8,654,649 B2 2/2014 Vasseur
8,665,757 B2 3/2014 Kling
8,667,172 B2 3/2014 Ravindran
8,688,619 B1 4/2014 Ezick
8,699,350 B1 4/2014 Kumar
8,750,820 B2 6/2014 Allan
8,761,022 B2 6/2014 Chiabaut
8,762,477 B2 6/2014 Xie
8,762,570 B2 6/2014 Qian
8,762,707 B2 6/2014 Killian
8,767,627 B2 7/2014 Ezure
8,817,594 B2 8/2014 Gero
8,826,381 B2 9/2014 Kim
8,832,302 B1 9/2014 Bradford
8,836,536 B2 9/2014 Marwah
8,862,774 B2 10/2014 Vasseur
8,880,682 B2 * 11/2014 Bishop ................ G06F 11/3495 709/203
8,903,756 B2 12/2014 Zhao
8,937,865 B1 1/2015 Kumar
9,071,498 B2 6/2015 Beser
9,112,895 B1 8/2015 Lin
2002/0010795 A1 1/2002 Brown
2002/0048269 A1 4/2002 Hong
2002/0054593 A1 5/2002 Morohashi
2002/0077988 A1 6/2002 Sasaki
2002/0078066 A1 6/2002 Robinson
2002/0138551 A1 9/2002 Erickson
2002/0152305 A1 * 10/2002 Jackson .................. H04L 12/26 709/224
2002/0176404 A1 11/2002 Girard
2002/0188605 A1 12/2002 Adya
2002/0199014 A1 12/2002 Yang
2003/0046396 A1 * 3/2003 Richter ................... G06F 9/505 709/226
2003/0046437 A1 3/2003 Eytchison
2003/0048793 A1 3/2003 Pochon
2003/0051100 A1 3/2003 Patel
2003/0074472 A1 4/2003 Lucco
2003/0097447 A1 5/2003 Johnston
2003/0140257 A1 7/2003 Paterka
2004/0024879 A1 2/2004 Dingman
2004/0030602 A1 2/2004 Rosenquist
2004/0073715 A1 4/2004 Folkes
2004/0139230 A1 7/2004 Kim
2004/0221047 A1 11/2004 Grover
2004/0225627 A1 11/2004 Botros
2004/0252683 A1 12/2004 Kennedy
2005/0003832 A1 1/2005 Osafune
2005/0028156 A1 2/2005 Hammond
2005/0043060 A1 2/2005 Brandenberg
2005/0050211 A1 3/2005 Kaul
2005/0074001 A1 4/2005 Mattes
2005/0149508 A1 7/2005 Deshpande
2005/0159823 A1 7/2005 Hayes
2005/0198351 A1 9/2005 Nog
2005/0249196 A1 11/2005 Ansari
2005/0259637 A1 11/2005 Chu
2005/0262217 A1 11/2005 Nonaka
2005/0289222 A1 12/2005 Sahim
2006/0010249 A1 1/2006 Sabesan
2006/0029102 A1 2/2006 Abe
2006/0039379 A1 2/2006 Abe
2006/0051055 A1 3/2006 Ohkawa
2006/0072523 A1 4/2006 Richardson

(56) References Cited

U.S. PATENT DOCUMENTS

2006/0099973 A1 5/2006 Nair
2006/0129514 A1 6/2006 Watanabe
2006/0133343 A1 6/2006 Huang
2006/0173831 A1 8/2006 Basso
2006/0193295 A1 8/2006 White
2006/0206445 A1 9/2006 Andreoli
2006/0215684 A1 9/2006 Capone
2006/0223504 A1 10/2006 Ishak
2006/0256767 A1 11/2006 Suzuki
2006/0268792 A1 11/2006 Belcea
2007/0019619 A1 1/2007 Foster
2007/0073888 A1 3/2007 Madhok
2007/0094265 A1 4/2007 Korkus
2007/0112880 A1 5/2007 Yang
2007/0124412 A1 5/2007 Narayanaswami
2007/0127457 A1 6/2007 Mirtorabi
2007/0160062 A1 7/2007 Morishita
2007/0162394 A1 7/2007 Zager
2007/0189284 A1 8/2007 Kecskemeti
2007/0195765 A1 8/2007 Heissenbuttel
2007/0204011 A1 8/2007 Shaver
2007/0209067 A1 9/2007 Fogel
2007/0239892 A1 10/2007 Ott
2007/0240207 A1 10/2007 Belakhdar
2007/0245034 A1 10/2007 Retana
2007/0253418 A1 11/2007 Shiri
2007/0255699 A1 11/2007 Sreenivas
2007/0255781 A1 11/2007 Li
2007/0274504 A1 11/2007 Maes
2007/0276907 A1 11/2007 Maes
2007/0294187 A1 12/2007 Scherrer
2008/0005056 A1 1/2008 Stelzig
2008/0010366 A1 1/2008 Duggan
2008/0037420 A1 2/2008 Tang
2008/0043989 A1 2/2008 Furutono
2008/0046340 A1 2/2008 Brown
2008/0059631 A1 3/2008 Bergstrom
2008/0080440 A1 4/2008 Yarvis
2008/0101357 A1 5/2008 Iovanna
2008/0107034 A1 5/2008 Jetcheva
2008/0123862 A1 5/2008 Rowley
2008/0133583 A1 6/2008 Artan
2008/0133755 A1 6/2008 Pollack
2008/0151755 A1 6/2008 Nishioka
2008/0159271 A1 7/2008 Kutt
2008/0186901 A1 8/2008 Itagaki
2008/0200153 A1 8/2008 Fitzpatrick
2008/0215669 A1 9/2008 Gaddy
2008/0216086 A1 9/2008 Tanaka
2008/0243992 A1 10/2008 Jardetzky
2008/0256359 A1 10/2008 Kahn
2008/0270618 A1 10/2008 Rosenberg
2008/0271143 A1 10/2008 Stephens
2008/0287142 A1 11/2008 Keighran
2008/0288580 A1 11/2008 Wang
2008/0320148 A1 12/2008 Capuozzo
2009/0006659 A1 1/2009 Collins
2009/0013324 A1 1/2009 Gobara
2009/0022154 A1 1/2009 Kiribe
2009/0024641 A1 1/2009 Quigley
2009/0030978 A1 1/2009 Johnson
2009/0037763 A1 2/2009 Adhya
2009/0052660 A1 2/2009 Chen
2009/0067429 A1 3/2009 Nagai
2009/0077184 A1 3/2009 Brewer
2009/0092043 A1 4/2009 Lapuh
2009/0097631 A1 4/2009 Gisby
2009/0103515 A1 4/2009 Pointer
2009/0113068 A1 4/2009 Fujihira
2009/0144300 A1 6/2009 Chatley
2009/0157887 A1 6/2009 Froment
2009/0185745 A1 7/2009 Momosaki
2009/0193101 A1 7/2009 Munetsugu
2009/0222344 A1 9/2009 Greene
2009/0228593 A1 9/2009 Takeda
2009/0254572 A1 10/2009 Redlich
2009/0268905 A1 10/2009 Matsushima
2009/0285209 A1 11/2009 Stewart
2009/0287835 A1 11/2009 Jacobson
2009/0288163 A1 11/2009 Jacobson
2009/0292743 A1 11/2009 Bigus
2009/0293121 A1 11/2009 Bigus
2009/0300079 A1 12/2009 Shitomi
2009/0300407 A1 12/2009 Kamath
2009/0307333 A1 12/2009 Welingkar
2009/0323632 A1 12/2009 Nix
2010/0005061 A1 1/2010 Basco
2010/0027539 A1 2/2010 Beverly
2010/0046546 A1 2/2010 Ram
2010/0057929 A1 3/2010 Merat
2010/0088370 A1 4/2010 Wu
2010/0094767 A1 4/2010 Miltonberger
2010/0098093 A1 4/2010 Ejzak
2010/0100465 A1 4/2010 Cooke
2010/0103870 A1 4/2010 Garcia-Luna-Aceves
2010/0124191 A1 5/2010 Vos
2010/0125911 A1 5/2010 Bhaskaran
2010/0131660 A1 5/2010 Dec
2010/0150155 A1 6/2010 Napierala
2010/0165976 A1 7/2010 Khan
2010/0169478 A1 7/2010 Saha
2010/0169503 A1 7/2010 Kollmansberger
2010/0180332 A1 7/2010 Ben-Yochanan
2010/0182995 A1 7/2010 Hwang
2010/0185753 A1 7/2010 Liu
2010/0195653 A1 8/2010 Jacobson
2010/0195654 A1 8/2010 Jacobson
2010/0195655 A1 8/2010 Jacobson
2010/0217874 A1 8/2010 Anantharaman
2010/0232402 A1 9/2010 Przybysz
2010/0232439 A1 9/2010 Dham
2010/0235516 A1 9/2010 Nakamura
2010/0246549 A1 9/2010 Zhang
2010/0250497 A1 9/2010 Redlich
2010/0250939 A1 9/2010 Adams
2010/0268782 A1 10/2010 Zombek
2010/0272107 A1 10/2010 Papp
2010/0284309 A1 11/2010 Allan
2010/0284404 A1 11/2010 Gopinath
2010/0293293 A1 11/2010 Beser
2010/0322249 A1 12/2010 Thathapudi
2011/0013637 A1 1/2011 Xue
2011/0022812 A1 1/2011 vanderLinden
2011/0055392 A1 3/2011 Shen
2011/0055921 A1 3/2011 Narayanaswamy
2011/0090908 A1 4/2011 Jacobson
2011/0106755 A1 5/2011 Hao
2011/0145597 A1 6/2011 Yamaguchi
2011/0145858 A1 6/2011 Philpott
2011/0153840 A1 6/2011 Narayana
2011/0161408 A1 6/2011 Kim
2011/0202609 A1 8/2011 Chaturvedi
2011/0231578 A1 9/2011 Nagappan
2011/0239256 A1 9/2011 Gholmieh
2011/0258049 A1 10/2011 Ramer
2011/0264824 A1 10/2011 Venkata Subramanian
2011/0265174 A1 10/2011 Thornton
2011/0271007 A1 11/2011 Wang
2011/0286457 A1 11/2011 Ee
2011/0286459 A1 11/2011 Rembarz
2011/0295783 A1 12/2011 Zhao
2011/0299454 A1 12/2011 Krishnaswamy
2012/0011170 A1 1/2012 Elad
2012/0011551 A1 1/2012 Levy
2012/0036180 A1 2/2012 Thornton
2012/0047361 A1 2/2012 Erdmann
2012/0066727 A1 3/2012 Nozoe
2012/0106339 A1 5/2012 Mishra
2012/0114313 A1 5/2012 Phillips
2012/0120803 A1 5/2012 Farkas
2012/0136676 A1 5/2012 Goodall
2012/0136936 A1 5/2012 Quintuna
2012/0136945 A1 5/2012 Lee
2012/0137367 A1 5/2012 Dupont

(56) References Cited

U.S. PATENT DOCUMENTS

| | | | |
|---|---|---|---|
| 2012/0141093 | A1 | 6/2012 | Yamaguchi |
| 2012/0155464 | A1 | 6/2012 | Kim |
| 2012/0158973 | A1 | 6/2012 | Jacobson |
| 2012/0163373 | A1 | 6/2012 | Lo |
| 2012/0179653 | A1 | 7/2012 | Araki |
| 2012/0197690 | A1 | 8/2012 | Agulnek |
| 2012/0198048 | A1 | 8/2012 | Ioffe |
| 2012/0221150 | A1 | 8/2012 | Arensmeier |
| 2012/0224487 | A1 | 9/2012 | Hui |
| 2012/0257500 | A1 | 10/2012 | Lynch |
| 2012/0284791 | A1 | 11/2012 | Miller |
| 2012/0290669 | A1 | 11/2012 | Parks |
| 2012/0290919 | A1 | 11/2012 | Melnyk |
| 2012/0291102 | A1 | 11/2012 | Cohen |
| 2012/0314580 | A1 | 12/2012 | Hong |
| 2012/0317307 | A1 | 12/2012 | Ravindran |
| 2012/0331112 | A1 | 12/2012 | Chatani |
| 2013/0041982 | A1 | 2/2013 | Shi |
| 2013/0051392 | A1 | 2/2013 | Filsfils |
| 2013/0060962 | A1 | 3/2013 | Wang |
| 2013/0073552 | A1 | 3/2013 | Rangwala |
| 2013/0074155 | A1 | 3/2013 | Huh |
| 2013/0091539 | A1 | 4/2013 | Khurana |
| 2013/0110987 | A1 | 5/2013 | Kim |
| 2013/0111063 | A1 | 5/2013 | Lee |
| 2013/0151584 | A1 | 6/2013 | Westphal |
| 2013/0151646 | A1* | 6/2013 | Chidambaram .... H04L 47/6205 709/213 |
| 2013/0163426 | A1 | 6/2013 | Beliveau |
| 2013/0166668 | A1 | 6/2013 | Byun |
| 2013/0173822 | A1 | 7/2013 | Hong |
| 2013/0182568 | A1 | 7/2013 | Lee |
| 2013/0185406 | A1 | 7/2013 | Choi |
| 2013/0197698 | A1 | 8/2013 | Shah |
| 2013/0198119 | A1 | 8/2013 | Eberhardt, III |
| 2013/0219038 | A1 | 8/2013 | Lee |
| 2013/0219081 | A1 | 8/2013 | Qian |
| 2013/0219478 | A1 | 8/2013 | Mahamuni |
| 2013/0223237 | A1 | 8/2013 | Hui |
| 2013/0227166 | A1 | 8/2013 | Ravindran |
| 2013/0242996 | A1 | 9/2013 | Varvello |
| 2013/0250809 | A1 | 9/2013 | Hui |
| 2013/0282854 | A1 | 10/2013 | Jang |
| 2013/0282860 | A1 | 10/2013 | Zhang |
| 2013/0282920 | A1 | 10/2013 | Zhang |
| 2013/0304937 | A1 | 11/2013 | Lee |
| 2013/0329696 | A1 | 12/2013 | Xu |
| 2013/0336323 | A1 | 12/2013 | Srinivasan |
| 2013/0343408 | A1 | 12/2013 | Cook |
| 2014/0003232 | A1 | 1/2014 | Guichard |
| 2014/0006565 | A1 | 1/2014 | Muscariello |
| 2014/0029445 | A1 | 1/2014 | Hui |
| 2014/0032714 | A1 | 1/2014 | Liu |
| 2014/0040505 | A1 | 2/2014 | Barton |
| 2014/0074730 | A1 | 3/2014 | Arensmeier |
| 2014/0075567 | A1 | 3/2014 | Raleigh |
| 2014/0082135 | A1 | 3/2014 | Jung |
| 2014/0089454 | A1 | 3/2014 | Jeon |
| 2014/0096249 | A1 | 4/2014 | Dupont |
| 2014/0129736 | A1 | 5/2014 | Yu |
| 2014/0136814 | A1 | 5/2014 | Stark |
| 2014/0140348 | A1 | 5/2014 | Perlman |
| 2014/0143370 | A1 | 5/2014 | Vilenski |
| 2014/0146819 | A1 | 5/2014 | Bae |
| 2014/0149733 | A1 | 5/2014 | Kim |
| 2014/0156396 | A1 | 6/2014 | deKozan |
| 2014/0165207 | A1 | 6/2014 | Engel |
| 2014/0172783 | A1 | 6/2014 | Suzuki |
| 2014/0172981 | A1 | 6/2014 | Kim |
| 2014/0173034 | A1 | 6/2014 | Liu |
| 2014/0192717 | A1 | 7/2014 | Liu |
| 2014/0195328 | A1 | 7/2014 | Ferens |
| 2014/0195666 | A1 | 7/2014 | Dumitriu |
| 2014/0233575 | A1 | 8/2014 | Xie |
| 2014/0237085 | A1 | 8/2014 | Park |
| 2014/0280823 | A1 | 9/2014 | Varvello |
| 2014/0281489 | A1 | 9/2014 | Peterka |
| 2014/0281505 | A1 | 9/2014 | Zhang |
| 2014/0282816 | A1 | 9/2014 | Xie |
| 2014/0289325 | A1 | 9/2014 | Solis |
| 2014/0289790 | A1 | 9/2014 | Wilson |
| 2014/0314093 | A1 | 10/2014 | You |
| 2014/0365550 | A1 | 12/2014 | Jang |
| 2015/0006896 | A1 | 1/2015 | Franck |
| 2015/0018770 | A1 | 1/2015 | Baran |
| 2015/0032892 | A1 | 1/2015 | Narayanan |
| 2015/0063802 | A1 | 3/2015 | Bahadur |
| 2015/0095481 | A1 | 4/2015 | Ohnishi |
| 2015/0095514 | A1 | 4/2015 | Yu |
| 2015/0188770 | A1 | 7/2015 | Naiksatam |

FOREIGN PATENT DOCUMENTS

| | | | |
|---|---|---|---|
| EP | 0295727 | A2 | 12/1988 |
| EP | 0757065 | A2 | 7/1996 |
| EP | 1077422 | A2 | 2/2001 |
| EP | 1384729 | A1 | 1/2004 |
| EP | 2124415 | A2 | 11/2009 |
| EP | 2214357 | A1 | 8/2010 |
| WO | 03005288 | A2 | 1/2003 |
| WO | 03042254 | A1 | 5/2003 |
| WO | 03049369 | A2 | 6/2003 |
| WO | 03091297 | A1 | 11/2003 |
| WO | 2007113180 | A1 | 10/2007 |
| WO | 2007144388 | A1 | 12/2007 |
| WO | 2011049890 | A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/.downloaded Mar. 11, 2015.

"The FP7 4WARD project," http://www.4ward-project.eu/.downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGSHOPS Operating Systems Review, vol. 33, No. 5, pp. 16-31, Dec. 1999.

(56) References Cited

OTHER PUBLICATIONS

Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boner, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim Hj Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer ScienceVolume 5443 (2009).

(56) References Cited

OTHER PUBLICATIONS

V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. Cans. Spring Lecture Notes in Computer Science vol. 5339 (2008).
S. Chow, J. Weng, Y. Yang, and R. Deng. Efficient Unidirectional Proxy Re-Encryption. Progress in Cryptology-AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N. E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.

(56) References Cited

OTHER PUBLICATIONS

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

* cited by examiner

SYSTEM AND METHOD FOR MANAGING DEVICES OVER A CONTENT CENTRIC NETWORK

BACKGROUND

1. Field

This disclosure is generally related to remote device management. More specifically, this disclosure is related to monitoring or controlling devices over a Content Centric Network.

2. Related Art

In a content centric network (CCN), a client device can obtain data by disseminating an Interest message that includes a name for this data. Intermediate routers in CCN propagate this Interest toward any content producer associated with the Interest's name prefix. The content producer that receives the Interest can generate and return a Content Object that satisfies the Interest (e.g., the name of the Content Object exactly matches the name in the Interest packet). The routers then forward the Content Object to the client device along the reverse path traversed by the Interest message, leveraging reverse-path information left in the routers by the Interest message.

The CCN architecture is designed to allow a client to obtain data efficiently and securely without regard to where the data comes from. However, a typical CCN network does not allow an administrator to efficiently monitor or configure a hierarchy of devices in a network.

SUMMARY

One embodiment provides a methodology for managing devices over a content centric network (CCN). These devices can include a computer (e.g., a laptop, a server, a mobile device), a networking device (e.g., a switch), or an appliance (e.g., a smart TV, thermostat, etc.). During operation, a device (e.g., a router or a data forwarding device) can receive an Interest for managing a device resource, such that the Interest's name includes the name or a name prefix associated with the device resource, and includes a command for managing the device resource. The device performs a longest-prefix-matching lookup using the Interest's name to determine a destination for the Interest. If the Interest's destination includes a component of the local device, the device forwards the Interest to an agent for the component of the local device.

In CCN, each piece of content is individually named, and each piece of data is bound to a unique name that distinguishes the data from any other piece of data, such as other versions of the same data or data from other sources. This unique name allows a client to request the data by disseminating a request or an Interest that indicates the unique name, and can obtain the data independent from the data's storage location, network location, application, and means of transportation. The following terms describe elements of a CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the longest-prefix-matching lookup results can include a plurality of components. Also, the device can forward the Interest to the plurality of components, and receives a Content Object (CO) from each of the plurality of components, such that a respective Content Object provides status information for a corresponding component. The device then generates a Content Object that includes a status information summary for the status information from plurality of Content Objects, and returns the Content Object to satisfy the Interest.

In some embodiments, the status information summary can include a compilation of status information from the plurality of components, and/or can include one or more aggregate values that aggregate the status information for the plurality of components.

In some embodiments, the component maintains status information that includes a component variable, a counter value, and/or a configuration state.

In some embodiments, the component includes a hardware component of the local device, and the agent can run on the local device on behalf of the hardware component.

In some embodiments, the component includes a software component or a hardware component that includes the agent for processing the Interest.

In some embodiments, the component can include a line card, a temperature sensor, a fan controller, a forwarding information base (FIB), a pending Interest table (PIT), or a content store (CS).

One embodiment provides a device that facilitates managing one or more device resources based on their name prefix. During operation, the device can receive a first Interest for managing a device resource, such that the Interest's name includes a name or a name prefix for the device and a command for monitoring or configuring the device resource. If the device determines that the first Interest's name corresponds to the local device, the device analyzes the first Interest's command to determine a device resource of the device, and to determine a resource-managing operation to perform on the device resource. The device then performs the resource-managing operation on the device resource.

In some embodiments, the resource-managing operation causes the device to configure a configuration parameter for the device resource.

In some embodiments, the resource-managing operation causes the device to monitor an attribute of the device resource.

In some embodiments, the command includes a detailed-aggregation command, and the resource-managing operation causes the device to monitor an attribute of a plurality of resources of the local device.

In some embodiments, the command includes an aggregation-summary command, and the resource-managing operation causes the device to compute an aggregated attribute from a plurality of resources of the local device.

In some embodiments, the command includes an alert-configuring command, and the resource-managing operation configures the device to issue an alert in response to detecting that a predetermined condition is satisfied.

In some embodiments, when the device determines that the alert's condition is satisfied, the device processes the alert to generate an alert message, and sends the alert message to a predetermined target device over the content centric network.

In some embodiments, while sending the alert message, the device determines, from the first Interest, a routable prefix for the predetermined target device. The device generates a second Interest that includes the routable prefix and the alert message, and disseminates the second Interest over the content centric network.

In some embodiments, the first Interest originated from the predetermined target device that is to receive the alert message. While sending the alert message, the device generates a Content Object with a name that includes the first Interest's name, and with a payload that includes the alert message. The device then returns the Content Object over the content centric network to satisfy the first Interest, and to provide the alert message to the predetermined target device.

BRIEF DESCRIPTION OF THE FIGURES

In the figures, like reference numerals refer to the same figure elements.

DETAILED DESCRIPTION

Figure 1:
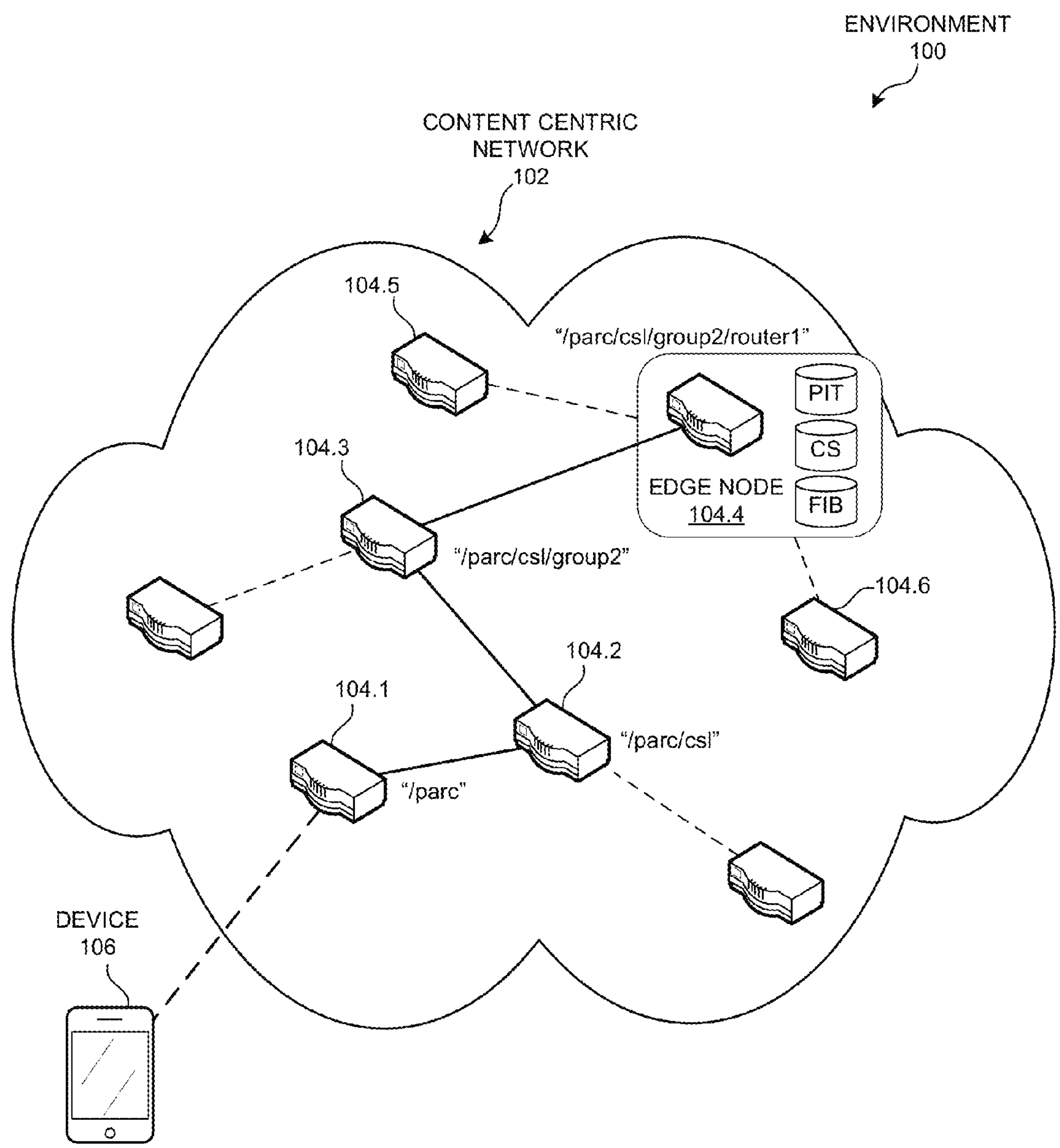
FIG. 1 illustrates an exemplary computing environment that facilitates managing devices over a content centric network in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide an agent or daemon running on a device that solves the problem of monitoring or configuring the device remotely over a CCN network. The devices can build or join a hierarchical namespace in a way that each device that is to be managed or controlled has a unique routable prefix in the namespace hierarchy.

A computer (or an application on any device) that is to remotely manage these devices can disseminate an Interest toward a specific device or device component by generating the Interest's name to include the routable prefix to the device. The Interest's name can also specify a query for monitoring or configuring parameters or attributes of the device or component. For example, a system administrator can use a CCN application (or a service) on a personal computer or a server to configure a plurality of devices across an organization's namespace. Also, a computer or server can disseminate device-monitoring Interests over the Content Centric Network, to collect real-time statistics from a plurality of devices in the namespace and across the organization's network. The device can issue an alert if problems are detected in the collected information, and can periodically generate a report that describes the network's performance.

In some embodiments, a device or component can generate a unique name prefix for itself based on the routable prefix to a neighboring node, such as to a local area network (LAN) or wide-area network (WAN) router. Alternatively, the device can obtain a unique routable prefix from an organization's server that is responsible for assigning unique routable prefixes to devices in the organization's namespace, such as based on their location in the organization's network. Each routable prefix is unique to a device, which allows other devices to send packets (e.g., CCN Interests) directly to the desired device.

Also, the routable prefixes include a hierarchical name structure, which routers along the network can use to forward the packet to a specific target device based on the device's unique routable prefix. Note that, unlike Internet Protocol (IP) networks, the routable prefixes are hierarchical in nature and do not have a fixed length. Also, note that the routable prefixes are not IP-prefixes as in the current Internet, but are based on the name of the device. For example, a router or gateway to a device can have a routable prefix that is a subset (a name prefix) to the target device's routable prefix. Hence, an Interest for the target device can be first propagated to the router or gateway based on a portion of the Interest's name prefix that matches the router or gateway's routable prefix. The router or gateway then performs a local longest-prefix-matching lookup in a local Forwarding Information Base (FIB) to determine an interface for forwarding the Interest, and uses this interface to forward the Interest to the target device.

Also note that the CCN routable prefixes can be used directly to forward an Interest to the target device. Unlike Internet domain names, a computer does not need to first resolve the CCN routable prefixes to a fixed-length IP address before sending an Interest to the target device. Also, unlike IP networks, CCN routers do not need to perform network address translation (NAT) to forward an Interest from outside a local area network (LAN) to a device in the LAN. Rather, the Interest is forwarded along a network path defined by the routable prefix, starting from a device associated with the Interest's highest-level name prefix, and ending at a device or device component whose name matches the Interest's routable prefix.

FIG. 1 illustrates an exemplary computing environment 100 that facilitates managing devices over a content-centric network (CCN) in accordance with an embodiment. Specifically computing environment 100 can include a CCN 102 for an organization, such as an enterprise CCN. CCN 102 can include a collection of routers 104 that forward Interests across CCN 102 based on their routable prefix.

For example, routers 104 may be components in a network named "PARC." A router 104.1 can include a subscriber edge router, which can interface CCN 102 to an Internet service provider (ISP). The ISP can forward any Interest with the name prefix "/parc" to router 104.1, hence router 104.1 can have a root routable prefix "/parc" A client device 106, for example, can disseminate an Interest to devices in CCN 102 by including the routable prefix "/parc" in the Interest's name.

A set of routers 104.2-104.6 may reside in the computer science laboratory (CSL) at PARC. The routable prefix to routers 104.2-104.6 and any other devices in this lab may begin with the name prefix "/parc/csl." Specifically, router 104.2 may be an edge router for CSL, and can have the routable prefix "/parc/csl." Another router 104.3 in the CSL lab may provide network access to one or more offices or rooms for a group named "group2," and may be configured to have the routable prefix "/parc/csl/group2." A router for one of these rooms may have the routable prefix:

"/parc/csl/group2/router1."

Devices in this room of the CSL lab may be assigned the routable prefix:

"/parc/csl/group2/router1/{device_name}"

where {device_name} corresponds to a local name for the device.

Figure 2:
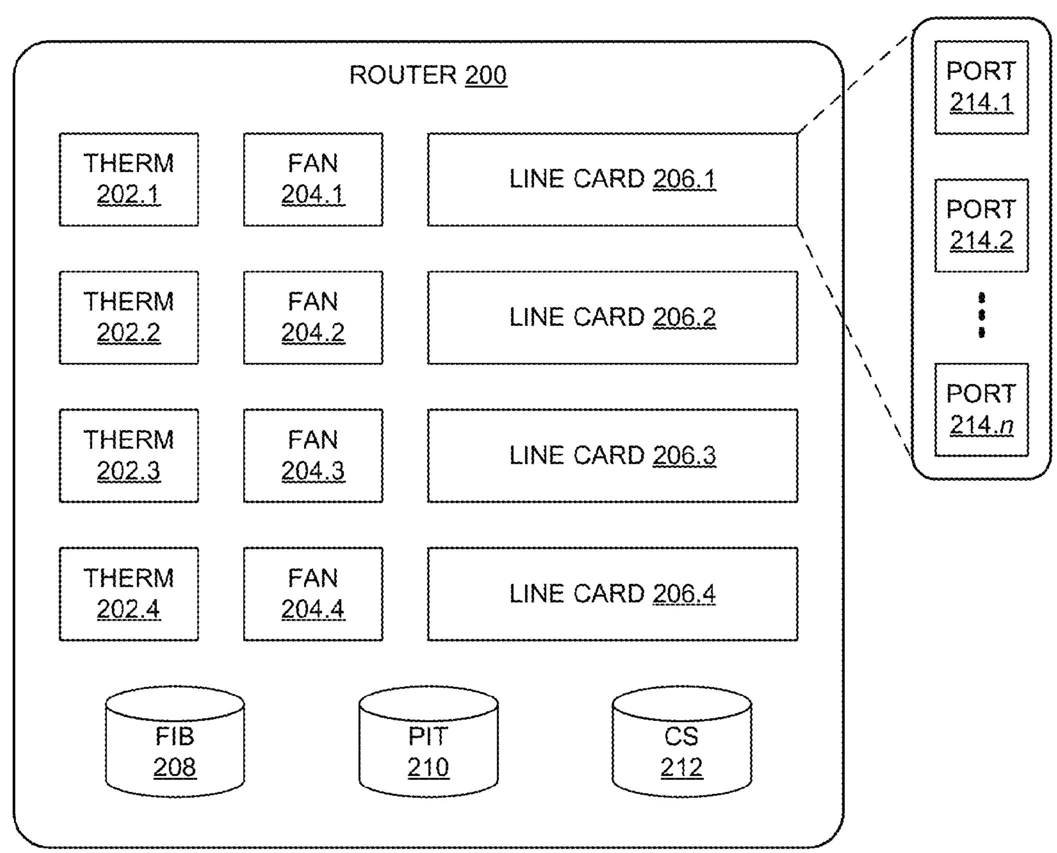
FIG. 2 illustrates an exemplary router whose components can be managed remotely over a content centric network in accordance with an embodiment.

FIG. 2 illustrates an exemplary router 200 whose components can be managed remotely over a content centric network in accordance with an embodiment. Specifically, router 200 can include a set of line cards 206 that interface with a network, such as a computer network. Line cards 206 can each include a set of network ports (e.g., Ethernet ports) that each interface a device to the network. Router 200 can also include a set of sensors, such as temperature sensors 202, and can include a set of fans 204 that regulate the temperature in router 200. In some embodiments, router 200 can execute an agent or daemon that monitors and controls various resources of router 200. For example, this agent can monitor a temperature sensor 202 for each line card 206, and can control a fan 204 to ensure that each line card 206 is operating within an acceptable temperature range.

Router 200 can also include CCN-related resources, such as a Forwarding Information Base (FIB) 208, a Pending Interest Table (PIT) 210, and a Content Store (CS) 212. The agent running on router 200 can use FIB 208, PIT 210, and CS 212 to process the incoming Interests and Content Objects. In addition, when this agent receives an Interest that includes commands for managing a local resource, the agent at router 200 can process these commands to monitor and/or configure the local resource. For example, the agent may process an Interest to monitor or control a temperature sensor 202 or a fan 204, or even a local CCN resource (e.g., FIB 208, PIT 210, or CS 212).

If the Interest is directed to a resource that has its own agent, the agent local to router 200 can forward the Interest to the resource's dedicated agent. For example, each of line cards 206 can include a processor and a memory, and can include an agent that executes on the processor and memory. If the agent at router 200 receives an Interest with a name prefix directed to line card 206.2, the local agent can forward the Interest to line card 206.2 for further processing.

While the example above is directed to a router, the techniques presented herein can also apply to any electronic device now know or later developed. For example, a server, a personal computer, or a networked appliance can execute an agent or daemon that monitors and controls various local resources, and that allows these local resources to be managed remotely over a content centric network.

Figure 3:
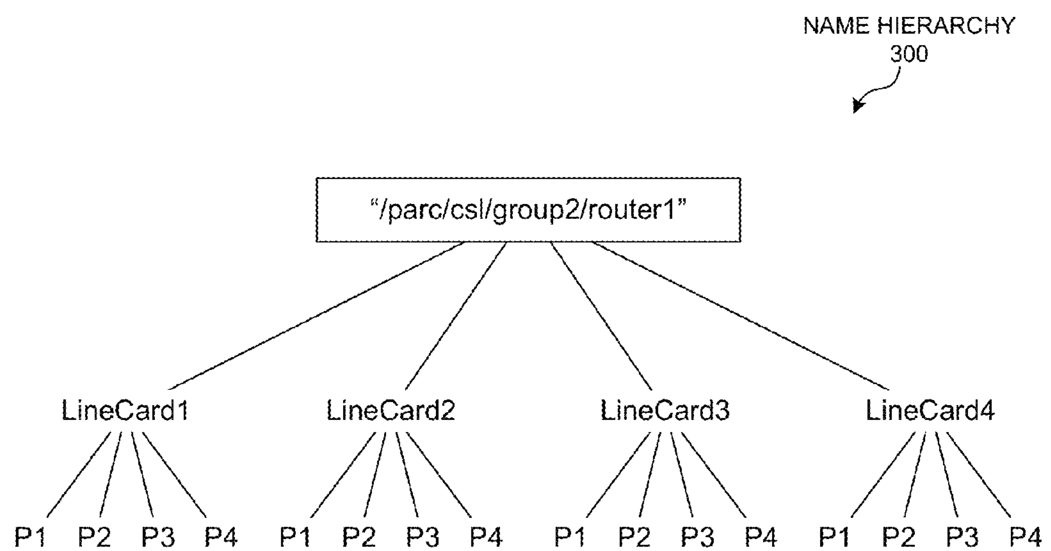
FIG. 3 illustrates an exemplary name hierarchy for a network router in accordance with an embodiment.

FIG. 3 illustrates an exemplary name hierarchy 300 for a router in accordance with an embodiment. The router may be assigned a routable prefix "/parc/csl/group2/router1" by a network-configuring server configured to assign a routable prefix to a device joining the "/parc" namespace or by any other appropriate network management tool.

The router can include a set of internal components (e.g., line cards) that each has an agent that can accept Interests for monitoring or managing the component. For example, each line card in router 1 can include a processor that runs an agent for the line card. The router can assign a local name to each internal component, and can forward an Interest to the internal component whose local name is specified in the Interest's name. This allows the router to forward an Interest "/parc/csl/group2/router1/LineCard2" to a line card named "LineCard2." Also, each line card can run an agent for each of its ports, such that a port's agent can be assigned a local name by the line card itself.

Once the router is assigned a unique routable prefix, the router or a remote device can control or monitor the router's resources over the content centric network. For example, an administrator can use his personal computer to monitor or configure port P1 of LineCard2 by disseminating an Interest to the prefix:

"/parc/csl/group2/router1/LineCard2/*P*1" (1)

The Interest can configure a port parameter by specifying a query that includes the parameter and the value. In some embodiments, the Interest's name can be structured as:

"{prefix}/*q*={parameter}/{new_value}" (2)

where {prefix} includes prefix (1) and "q={parameter}/{new_value}" specifies the query with the parameter and value. In some embodiments, the Interest can include the parameters and new values as a payload in the Interest message. The Interest's name can be "{prefix}" and the Interest can include an explicit payload that specifies the query parameters and value.

In some embodiments, the query can configure a port speed, an available bandwidth, virtual LAN (VLAN) information, a Power over Ethernet (PoE) state (e.g., enabled, disabled), and Quality of Service (QoS) parameters. For example, the Interest can configure the port's port speed using the query:

"/parc/csl/group2/router1/LineCard2/P1/q=port_speed/10 mbps" (3)

Once this Interest reaches router 1, the agent at router 1 performs a longest-prefix-matching lookup (e.g., on a local FIB) to identify LineCard2, and forwards the Interest to the agent running on LineCard2. Similarly, the agent running on LineCard2 performs a longest-prefix-matching lookup to forward the Interest to a local agent for port P1. The agent for port P1 then processes the Interest to set the port speed to 10 mbps, and can return a Content Object that acknowledges the operation.

In some embodiments, an Interest can monitor a measurement or counter value from one or more devices or resources. For example, the Interest's name can be structured as:

"{prefix_of_device_or_component}/q={parameter} (4)

An Interest directed to a router or line card can monitor, for example, a counter value for a number of packets forwarded, a number of dropped packets, an average packet size, or any other router-specific measurement or parameter. Hence, once the Interest "/parc/csl/group2/router1/LineCard2/P1/q=dropped_packets" (5)

reaches the agent for port P1 of LineCard2, this agent reads the local "dropped_packets" value that specifies the total number of packets that have been dropped at port P1. The agent then generates and returns a Content Object that includes the Interest's name, and includes the number of dropped packets in the Content Object's body.

In some embodiments, an Interest can query aggregate data from a plurality of components. The aggregate data can list the individual values from each of the plurality of components, or can include a single value that quantifies the aggregate value from the set of components. The aggregate values can be collected and/or summarized at the router level, at the line-card level, at the port level, or at the virtual port level.

For example, the Interest:

"/parc/csl/group2/router1/LineCard2/q=dropped_packets/detailed" (6)

includes the reserved word "detailed" which informs the agent at LineCard2 to generate a detailed report that lists the number of packets dropped at each of the ports. LineCard2 processes the Interest by generating an Interest similar to (6), for each of the ports to query the "dropped_packets" value from each port. If a port itself includes a virtual port, the port can generate and return a detailed report of the "dropped_packets" value across all virtual ports. Once LineCard2 obtains the individual values from each port, LineCard2 can generate and return a Content Object that includes the Interest name (6), and includes the individual "dropped_packets" value received from each port in the Content Object's body.

As another example, the Interest

"/parc/csl/group2/router1/LineCard2/q=*dropped*_packets/summary" (7)

Includes a query with the reserved word "summary" which informs the agent at LineCard2 to generate a summary of the number of dropped packets across all ports of LineCard2. LineCard2 processes the Interest by querying each of the ports for the "dropped_packets" value from the port (and its virtual ports), and computes a new "dropped_packets" value that sums the number of dropped packets from each port (and virtual port) of LineCard2. Once LineCard2 computes the aggregate "dropped_packets" value, LineCard2 can generate and return a Content Object that includes the Interest name (7), and includes the aggregate "dropped_packets" value in the Content Object's body.

In some embodiments, a system administrator can disseminate an Interest that queries a collection of devices within a CCN name hierarchy. For example, the Interest "/parc/csl/q=*dropped*_packets/detailed" (8)

can reach a router for the CSL department with the routable prefix "/parc/csl/." This CSL router can process Interest (8) by iterating across the devices at one level lower in the CCN name hierarchy to query these devices for a detailed report of the number of dropped packets. The CSL router can do so by generating new Interest packets for each of the devices (or components) in the CCN name hierarchy, and receiving matching Content Objects from each device or component. The CSL router then parses the Content Objects it receives, generates a new Content Object that summarizes the information from the Content Objects it receives, and responds to the original Interest using this newly created Content Object.

The devices in the CCN hierarchy can include the line cards and/or ports local to the CSL router, and can include other routers or devices with the name prefix "/parc/csl/{device_name}." These routers also query the routers at one level below them, as well as each local line card and/or port. Each line card then queries each port to obtain a detailed report for the number of dropped packets at each port and virtual port. This way, if an organization has a large number of devices in a network, a system administrator can issue one Interest to obtain a detailed report from the collection of devices within a CCN name hierarchy.

The agents can also monitor or configure CCN-related resources, such as a Forwarding Information Base (FIB), a Pending Interest Table (PIT), or a Content Store (CS). An administrator's computing device can send an Interest to a device to query a number of entries in the PIT. For example, the device can disseminate the query:

"/parc/csl/group2/PIT/q=*/bbc/headlines/PendingInterests"* (9)

The query in Interest (9) queries the router with the routable prefix "/parc/csl/group2" for a number of pending Interests for the name prefix "/bbc/headlines."

The administrator's computer can also disseminate Interests to change or configure a CCN resource on a remote device. In some embodiments Interest can configure a FIB, PIT, or CS resource to create, modify, or delete entries in the resource. For example, the administrator can modify the FIB entry for a router at the namespace "/parc/csl/group2" to change the outbound interface for the namespace "/bbc/headlines" to the interface set "2,3" using the Interest:

"/parc/csl/group2/FIB/q=/bbc/headlines/InterfaceSet=2,3" (10)

As another example, the administrator can modify the Content Store for a router at the routable prefix "/parc/csl/ group2" to change the maximum cache size for the namespace "/bbc/headlines" to 2 GB using the Interest:

"/parc/csl/group2/CS/*q*=/bbc/headlines/CS=2*G*" (11)

This configures the router to limit the amount of content with the name prefix "/bbc/headlines" that is cached to 2 GB. The administrator can also disseminate other cache-configuring Interests to limit the amount of content that is cached for other name prefixes. For example, the administrator can disseminate the following Interest to configure the Content Store to limit the cache size for all content to 10 GB by specifying the root name prefix "/" in the query:

"/parc/csl/group2/CS/*q*=/=2*G*" (12)

Processing Device-Managing Interests

Figure 4:
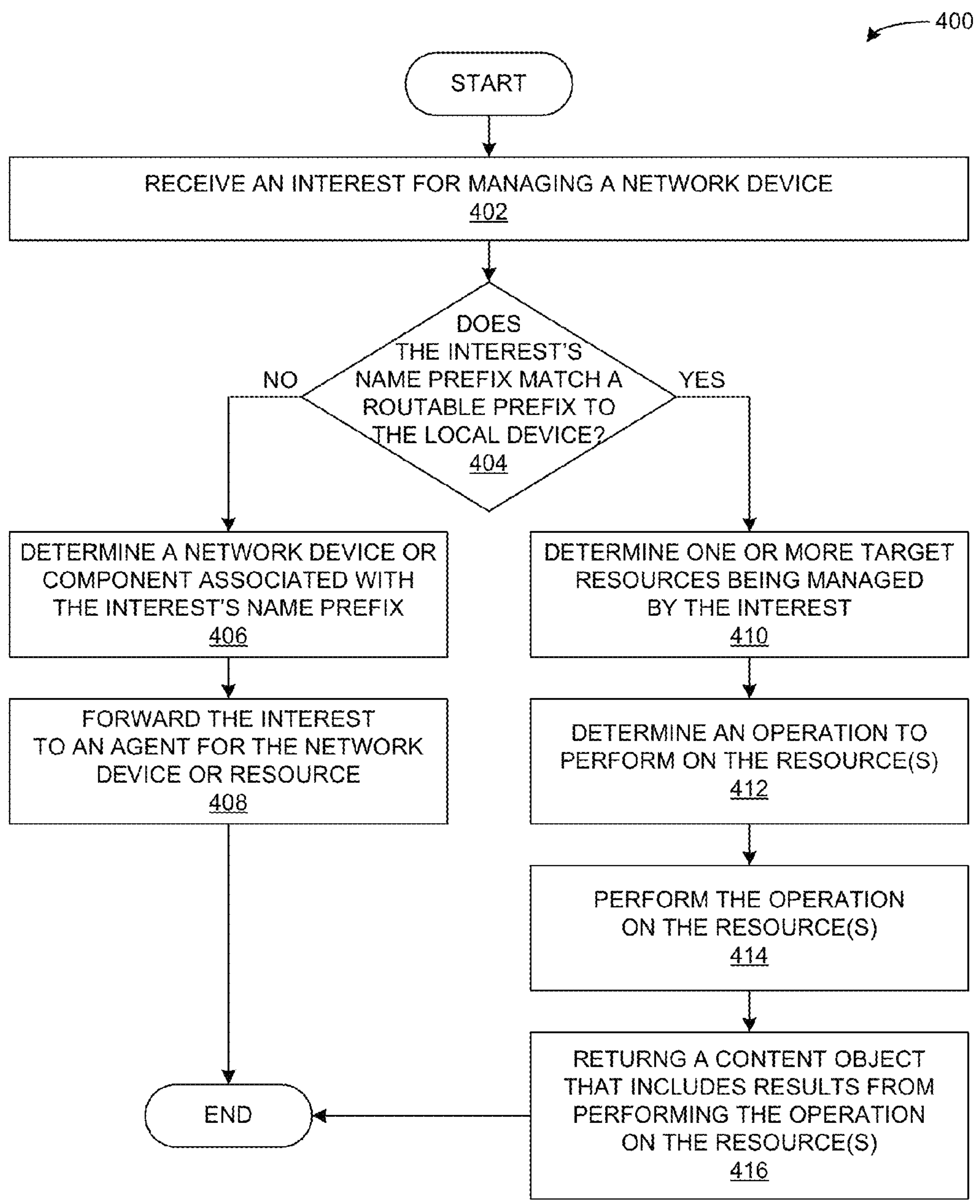
FIG. 4 presents a flow chart illustrating a method for processing a device-managing Interest at a device in accordance with an embodiment.

FIG. 4 presents a flow chart illustrating a method 400 for processing a device-managing Interest at a device in accordance with an embodiment. During operation, the device (e.g., a standalone device, or a component of a standalone device) can receive an Interest message for managing a device (operation 402). For example, the local device may include an agent that processes Interests received via one or more faces, and that manages a set of resources of the local device. The Interest message includes a routable prefix and a command. Hence, the local agent can use the routable prefix to determine whether to process the Interest locally or to forward the Interest to a target device (or device component) that is to be monitored or managed.

The agent determines whether the Interest's name prefix matches a routable prefix to the local agent (operation 404). If not, the Interest is not intended to be processed by the local agent. Hence, the agent determines a target device or component associated with the Interest's name prefix (operation 406), and forwards the Interest to an agent for the target device or resource (operation 408). This target agent may execute on a different device or component, or can be an agent that runs on the local device and manages one or more resources of the local device. For example, the local device may include a set of components that each includes a processor executing an agent. As another example, the local device may execute a set of sub-agents that each manages a set of resources for the local device. A router's sub agent may manage resources such as a sensor (e.g., a thermometer), a fan, a line card, a graphics card, and/or any other component of the device. A personal device's sub-agent may manage resources such as a smartphone's image sensor, global positioning system (GPS) sensor, accelerometer, and/or any application running on the device. Other exemplary resources can include, for example, a device's FIB, PIT, or CS.

On the other hand, if the Interest's name prefix matches the local device's routable prefix, the Interest has arrived at the target device that is being managed. To process the Interest, the device's agent determines one or more resources being managed by the Interest (operation 410), and determines an operation to perform on the resource(s) (operation 412). The device performs the operation on the one or more resources (operation 414), and can return a Content Object that includes results from performing the operation on the resource(s) (operation 416).

In some embodiments, the Interest may specify a command for configuring or monitoring resources across various sub-agents that span one or more levels of a CCN namespace hierarchy. For example, the command may request a router to monitor network statistics from a plurality of ports across multiple line cards. In some embodiments, these line cards can include a processing unit that executes an agent. Alternatively, the local device can execute an agent for each line card. These line-card agents correspond to a lower level of the CCN namespace hierarchy and function as sub-agents to the router's agent.

The local agent can perform the Interest's operations on the resources (operation 414) by generating and disseminating an Interest directed to each of the multiple sub-agents. These sub-agents then process the Interest to configure or monitor the resources at or below their segment of the CCN namespace. Continuing the example above, a sub-agent for each of these line cards gathers the statistics information for the line card, and returns a Content Object that includes this statistics information. Once the local agent receives the Content Objects from the sub-agents, the local agent can generate another Content Object that aggregates or summarizes the results from the various sub-agents.

Figure 5:
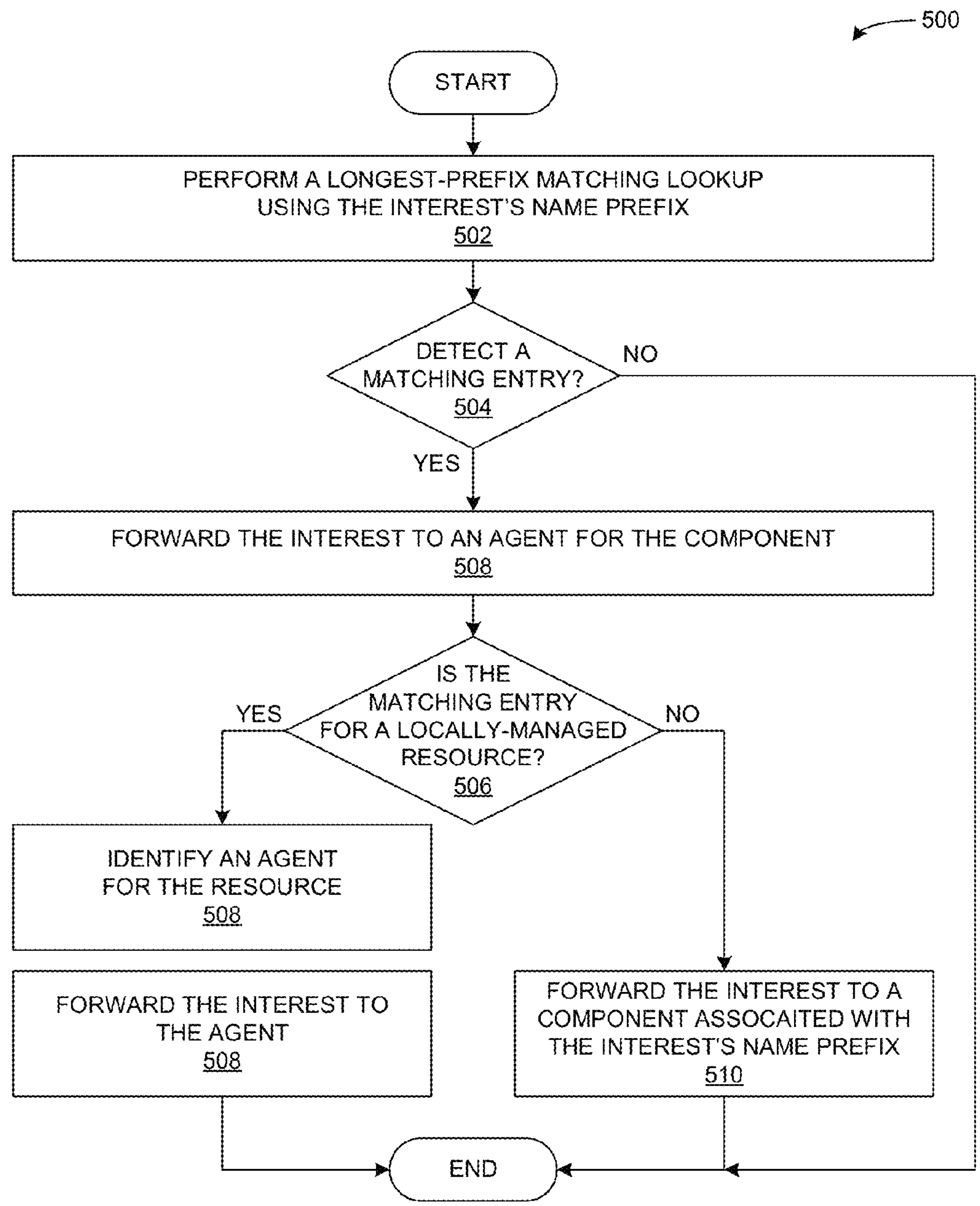
FIG. 5 presents a flow chart illustrating a method for forwarding a device-managing Interest in accordance with an embodiment.

FIG. 5 presents a flow chart illustrating a method 500 for forwarding a device-managing Interest in accordance with an embodiment. During operation, a device can forward an Interest that is not intended for the local device. The device can perform a longest-prefix matching lookup in a FIB (or in any other data structure that includes forwarding information) using the Interest's name prefix (operation 502), and determines whether a matching entry exists (operation 504). If a matching entry does not exist, the local device does not need to process the Interest.

Otherwise, the device obtains forwarding information from the lookup results (operation 506), and determines whether the matching entry corresponds to a locally-managed resource (operation 506). A locally-managed resource can include any component that does not include its own agent. The device can assign a name prefix to each of these components, and can launch and execute an agent for each of these components. If the Interest's name prefix corresponds to a locally-managed component, the device identifies the agent for the component (operation 508), and forwards the Interest to this agent (operation 510).

On the other hand, if the Interest's name prefix is not for a locally-managed resource, the device forwards the Interest to the target component associated with the Interest's name prefix (operation 512). The target component's agent can then forward the Interest, or processes the Interest locally.

Alert Messages

The agent at a device or component can also send alert messages when a predetermined condition is detected. An administrator can configure the agent to generate an alert by disseminating an alert-configuring Interest to the agent. In some embodiments, the alert-configuring Interest can have the form:

{component_prefix}/alert={attribute}/{attribute_value} (13)

In the alert-configuring Interest, {component_prefix} includes routable prefix to the component being configured to issue alerts. Also, the combination of {attribute} and {attribute_value} specify the criteria for issuing an alert for the attribute. Alternatively, the alert-configuring Interest can specify an explicit expression for the condition that triggers the alert, and can specify an explicit set of attributes to return in the alert message.

In some embodiments, an administrator's computing device can disseminate the alert-configuring Interest to query alert messages from the component. For example, the agent at the computing device can periodically disseminate an Interest to the component's routable prefix to query for alerts. The target component (and the agent at the component) can ignore the alert-configuring Interests, unless an alert has been triggered or is triggered before the alert-configuring Interest times out. If an alert is triggered, the component can return a Content Object in response to the most-recent or the next alert-configuring Interest. The Content Object can include the alert-Interest's name, and can include the alert message in the payload.

In some embodiments, the target component may require the administrator to have valid permission to query certain attributes or counter values, or to set certain configuration parameters. Hence, the administrator's computing device can generate the alert-configuring Interest to include security information for the administrator. The security information can include encrypted user credentials (e.g., a user identifier and password) at the end of the Interest's name, or as a name component of the Interest's name. The agent at the target component then verifies the administrator's permission to read or modify a restricted attribute prior to responding to a query Interest or an alert-configuring Interest.

Figure 6:
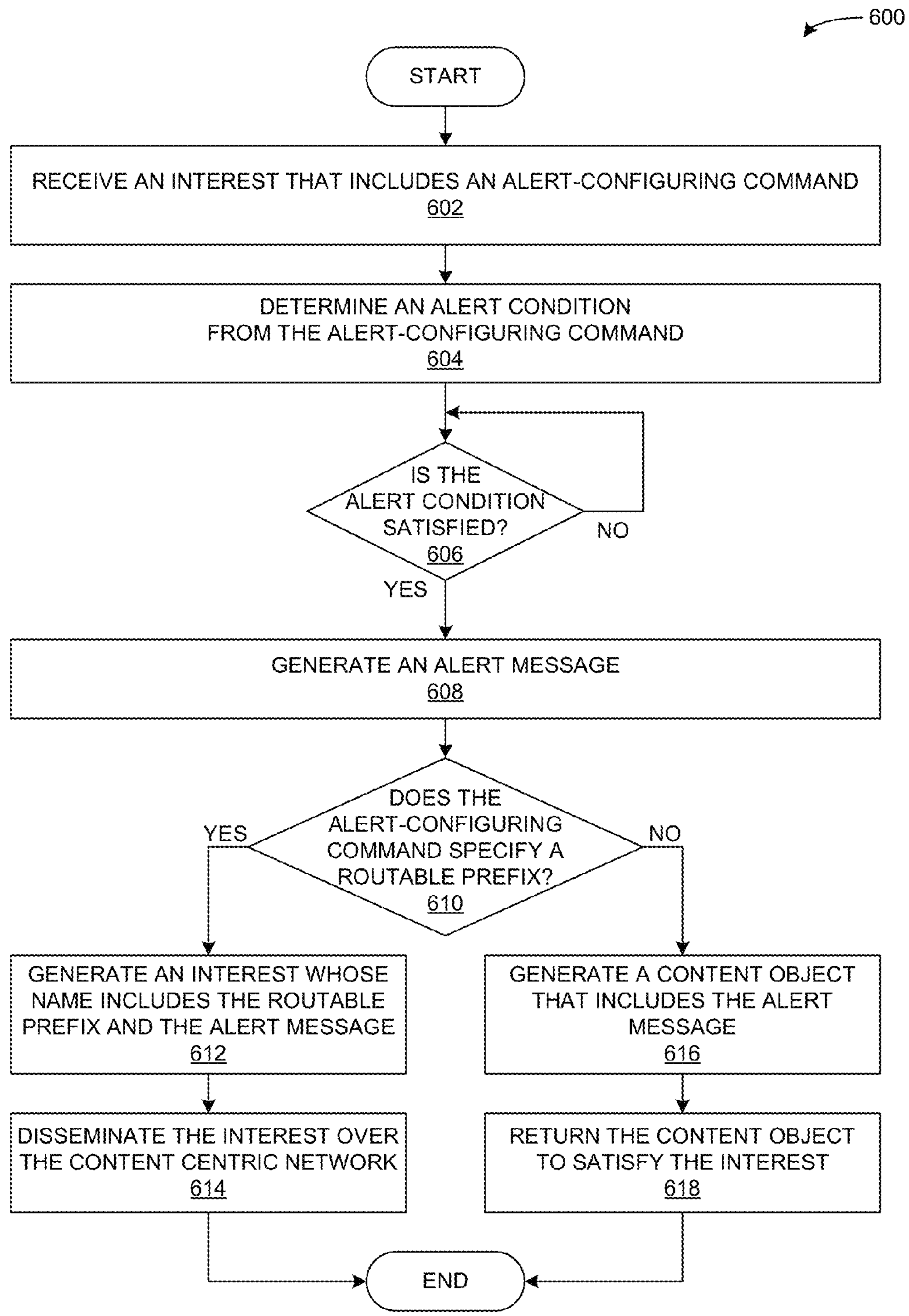
FIG. 6 presents a flow chart illustrating a method for configuring a device to return an alert message over a content centric network when an alert's condition is satisfied in accordance with an embodiment.

FIG. 6 presents a flow chart illustrating a method 600 for configuring a device to return an alert message over a content centric network when an alert's condition is satisfied in accordance with an embodiment. During operation, an agent at the device can receive an Interest that includes an alert-configuring command (operation 602). The alert-configuring command specifies a condition for generating an alert, and can include instructions for generating an alert message. The agent can obtain the alert condition from the alert-configuring command (operation 604), and determines whether the alert condition is satisfied (operation 606). For example, the agent may periodically process alert conditions for a set of alerts, or may process the alert conditions upon detecting a change to a variable found in an alert's condition.

If the agent determines that the alert's condition is satisfied, the agent proceeds to generate an alert message (e.g., by executing the alert's instructions for generating the message) (operation 608). In some embodiments, the alert message can include a predetermined message, or may include a message that is generated dynamically using data available to the agent. Furthermore, the alert's instructions may configure the agent to gather data from the local resources and/or from other agents to include a detailed log in the alert message. The detailed log may be a part of the alert's message, or may be included as an attachment to the alert's message.

The agent can then return the alert message to the source of the Interest, or to a predetermined routable prefix. For example, the agent can determine whether the alert-configuring command specifies a routable prefix (operation 610). If so, the agent generates an Interest whose name includes the routable prefix and the alert message (operation 612). The alert-configuring Interest can have the form:

{routable_prefix}/alert={component_prefix}/{alert_message} (14)

In Interest (14), {routable_prefix} includes the predetermined routable prefix for the Interest's destination, and {component_prefix} includes the routable prefix to the device or component that is issuing the alert. Also, {alert_message} includes the alert message being reported to the predetermined routable prefix. The agent can create the Interest to include a marshalled alert message. In some embodiments, the agent can create an Interest that includes an explicit payload carrying the alert message. The agent then disseminates the Interest over the content centric network (operation 614). Other CCN nodes then forward the alert's Interest to one or more secure devices associated with the routable prefix. These secure devices may or may not include the device that disseminated the initial Interest.

If the alert-configuring command does not specify a routable prefix, the agent can return the alert message to the device from which the Interest was received. The agent can generate a Content Object that includes the initial Interest's name, and whose payload includes the alert message (operation 616). The agent then returns the Content Object to satisfy the Interest (operation 618). Other CCN nodes propagate the Content Object along a reverse path established by the initial Interest. For example, an administrator can use a personal computing device to periodically disseminate an Interest that includes the local agent's routable prefix, and which queries the agent for a certain type of alert. The agent can ignore the Interest until either the alert's condition is satisfied or the Interest times out. If the alert's condition becomes satisfied after one Interest times out, the agent can return the alert message using a Content Object for the next Interest.

Figure 7:
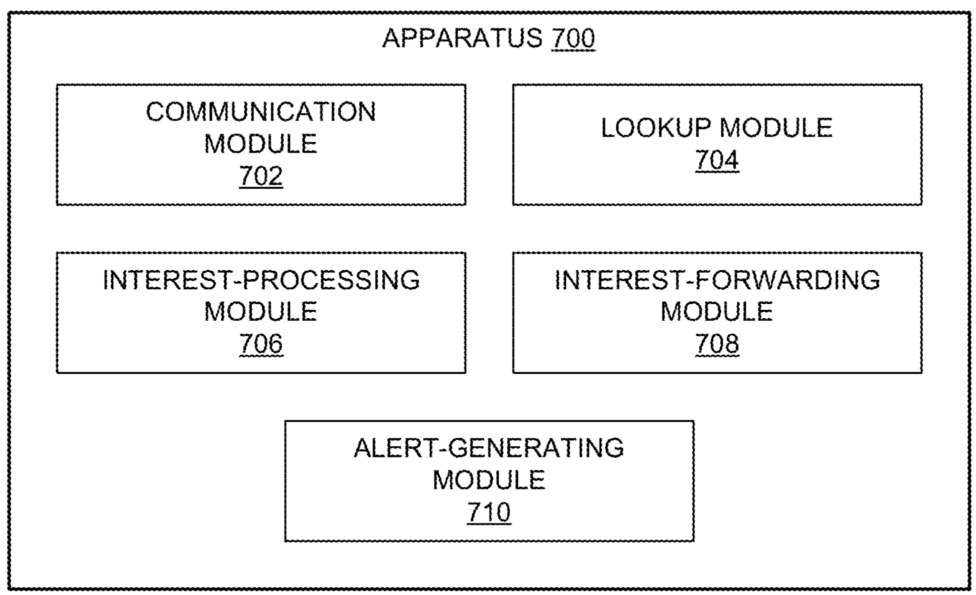
FIG. 7 illustrates an exemplary apparatus that facilitates managing devices over a content centric network in accordance with an embodiment.

FIG. 7 illustrates an exemplary apparatus 700 that facilitates managing devices over a content centric network in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a lookup module 704, an Interest-processing module 706, and an Interest-forwarding module 708, and an alert-generating module 710.

In some embodiments, communication module 702 can receive an Interest for managing a device resource, such that the Interest includes a name prefix and a command for the device resource. Lookup module 704 can perform a longest-prefix-matching lookup using the Interest's name prefix to determine a destination for the Interest. Interest-processing module 706 can process an Interest directed to apparatus 700 to perform a resource-managing operation on a resource of apparatus 700. Interest-forwarding module 708 can forward an Interest directed to an agent for a component of apparatus 700, or for another device within the namespace of apparatus 700. Alert-generating module 710 can issue an alert in response to detecting that a predetermined condition is satisfied.

Figure 8:
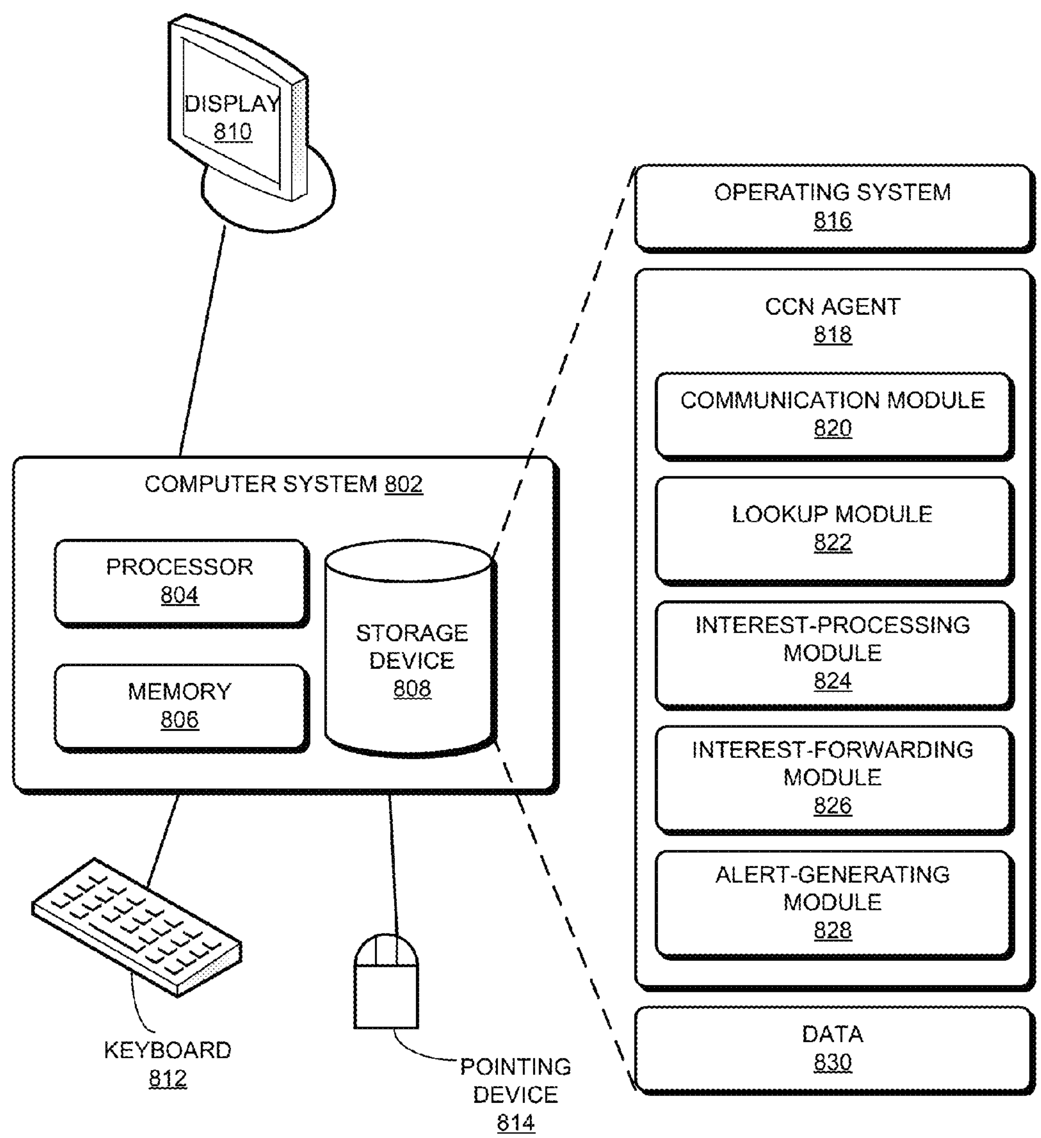
FIG. 8 illustrates an exemplary computer system that facilitates managing devices over a content centric network in accordance with an embodiment.

FIG. 8 illustrates an exemplary computer system 802 that facilitates managing devices over a content centric network in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, agent 818, and data 830.

Agent 818 can include instructions, which when executed by computer system 802, can cause computer system 802 to perform methods and/or processes described in this disclosure. Specifically, agent 818 may include instructions for receiving an Interest for managing a device resource, such that the Interest includes a name prefix and a command for the device resource (communication module 820). Further, agent 818 can include instructions for performing a longestprefix-matching lookup using the Interest's name prefix to determine a destination for the Interest (lookup module 822).

Agent 818 can also include instructions for processing an Interest directed to agent 818 to perform a resource-managing operation on a resource of agent 818 (Interest-processing module 824). Agent 818 can also include instructions for forwarding an Interest directed to an agent for a component of agent 818, or for another device within the namespace of agent 818 (Interest-forwarding module 826). Agent 818 can also include instructions for issuing an alert in response to detecting that a predetermined condition is satisfied (alert-generating module 828).

Data 830 can include any data that is required as input or that is generated as output by the methods and/or processes described in this disclosure. Specifically, data 830 can store at least configuration attributes, and counter values for one or more performance metrics.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:

receiving, by a device, an Interest for managing a device resource, wherein the Interest's name includes a name or a name prefix associated with the device resource, and includes a command for the device resource;

performing a longest-prefix-matching lookup using the Interest's name to determine a destination for the Interest, wherein performing the longest-prefix-matching lookup involves:

forwarding the Interest to a plurality of components;

receiving a Content Object (CO) from each of the plurality of components, wherein a respective Content Object includes a result produced by executing the command on a corresponding component; and generating a Content Object that includes a result summary for the information produced by the plurality of Content Objects;

determining, from the longest-prefix-matching lookup results, that the Interest's destination includes a component of the local device; and forwarding the Interest to an agent for the component of the local device.

2. The method of claim 1, wherein the result summary includes at least one of:

a compilation of results produced by the plurality of components; and one or more aggregate values that aggregate the results produced by the plurality of components.

3. The method of claim 1, wherein the result from the corresponding component includes at least one or more of:

component variables for one or more metrics;

counter values for one or more metrics; and a configuration state.

4. The method of claim 1, wherein the component includes a hardware component of the local device, and wherein the agent runs on the local device on behalf of the hardware component.

5. The method of claim 1, wherein the component includes a software component or a hardware component that includes the agent for processing the Interest.

6. The method of claim 1, wherein the component includes at least one of:

a line card;

a temperature sensor;

a fan controller;

a forwarding information base (FIB);

a pending Interest table (PIT); and a content store (CS).

7. A computer-implemented method, comprising:

receiving, by a device, a first Interest for managing a device resource, wherein the Interest's name includes a name or a name prefix for the device resource and a command for monitoring or configuring the device resource; and responsive to determining that the first Interest's name corresponds to the local device, analyzing the first Interest's command to determine a resource of the device, and to determine a resource-managing operation to perform on the device resource; and performing the resource-managing operation on the device resource, which involves, in response to determining that a predetermined condition of the command is satisfied:

generating an alert message;

generating a Content Object with a name that includes the first Interest's name, and with a payload that includes the alert message; and in response to determining that the first Interest originated from the predetermined target device that is to receive the alert message, returning the Content Object over the content centric network to satisfy the first Interest, and to provide the alert message to the predetermined target device.

8. The method of claim 7, wherein the resource-managing operation further involves configuring a configuration parameter for the device resource.

9. The method of claim 7, wherein the resource-managing operation further involves monitoring an attribute of the device resource.

10. The method of claim 7, wherein the command includes a detailed-aggregation command, and wherein performing the resource-managing operation further involves monitoring an attribute of a plurality of resources of the local device.

11. The method of claim 7, wherein the command includes an aggregation-summary command, and wherein performing the resource-managing operation further involves computing an aggregated attribute from a plurality of resources of the local device.

12. The method of claim 7, wherein performing the resource-managing operation on the device resource further involves, in response to determining that the first Interest did not originate from the predetermined target device that is to receive the alert message:

determining, from the first Interest, a routable prefix for the predetermined target device;

generating a second Interest that includes the routable prefix and the alert message, wherein the second Interest includes the alert message in a payload of the Interest, or includes the alert message in a name component following the routable prefix in the first Interest's name; and disseminating the second Interest over the content centric network.

13. A non-transitory computer-readable storage medium storing instructions that when executed by a computer cause the computer to perform a method, the method comprising:

receiving a first Interest for managing a device resource, wherein the Interest's name includes a name or a name prefix for the resource and a command for monitoring or configuring the device resource;

responsive to determining that the first Interest's name corresponds to the local device, analyzing the first Interest's command to determine a device resource of the device, and to determine a resource-managing operation to perform on the device resource; and performing the resource-managing operation on the device resource, which involves, in response to determining that a predetermined condition of the command is satisfied:

generating an alert message;

generating a Content Object with a name that includes the first Interest's name, and with a payload that includes the alert message; and in response to determining that the first Interest originated from the predetermined target device that is to receive the alert message, returning the Content Object over the content centric network to satisfy the first Interest, and to provide the alert message to the predetermined target device.

14. The storage medium of claim 13, wherein the resource-managing operation further involves configuring a configuration parameter for the device resource.

15. The storage medium of claim 13, wherein the resource-managing operation further involves monitoring an attribute of the device resource.

16. The storage medium of claim 13, wherein the command includes a detailed-aggregation command, and wherein performing the resource-managing operation further involves monitoring an attribute of a plurality of resources of the local device.

17. The storage medium of claim 13, wherein the command includes an aggregation-summary command, and wherein performing the resource-managing operation further involves computing an aggregated attribute from a plurality of resources of the local device.

18. The storage medium of claim 13, wherein performing the resource-managing operation on the device resource further involves, in response to determining that the first Interest did not originate from the predetermined target device that is to receive the alert message:

determining, from the first Interest, a routable prefix for the predetermined target device;

generating a second Interest that includes the routable prefix and the alert message, wherein the second Interest includes the alert message in a payload of the Interest, or includes the alert message in a name component following the routable prefix in the first Interest's name; and disseminating the second Interest over the content centric network.

* * * * *